(12) United States Patent
Chang

(10) Patent No.: US 7,966,964 B2
(45) Date of Patent: Jun. 28, 2011

(54) TAMPER-EVIDENT MECHANISM

(75) Inventor: Yung-Cheng Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 1098 days.

(21) Appl. No.: 11/555,346

(22) Filed: Nov. 1, 2006

(65) Prior Publication Data

US 2007/0235470 A1    Oct. 11, 2007

(30) Foreign Application Priority Data

Feb. 20, 2006  (TW) ................................ 95105665 A

(51) Int. Cl.
*G01D 11/00* (2006.01)
(52) U.S. Cl. ....................................... 116/200; 411/373
(58) Field of Classification Search ................. 116/200, 116/204, 208–209; 439/509; 200/61.82; 340/3.21; 411/373, 429; 292/251
See application file for complete search history.

(56) References Cited

U.S. PATENT DOCUMENTS

| | | | | |
|---|---|---|---|---|
| 3,298,272 A * | 1/1967 | Henderson | ..................... | 411/373 |
| 4,092,641 A * | 5/1978 | Bellinghausen et al. | ..... | 340/521 |
| 4,117,568 A * | 10/1978 | Bullock | ........................ | 16/110.1 |
| 4,150,371 A * | 4/1979 | Scaglione | ................... | 340/545.6 |
| 4,161,348 A * | 7/1979 | Ulrich | ........................... | 385/115 |
| 4,318,157 A * | 3/1982 | Rank et al. | ................... | 361/704 |
| 4,385,288 A * | 5/1983 | Bitko | ........................... | 340/571 |
| 4,446,458 A * | 5/1984 | Cook | ........................ | 340/3.21 |
| 4,523,883 A * | 6/1985 | Peterson et al. | ............... | 411/171 |
| 4,805,946 A * | 2/1989 | Erwin et al. | .................... | 292/251 |
| 5,066,246 A * | 11/1991 | Jensik | ............................ | 439/562 |
| 5,104,274 A * | 4/1992 | Omori | ............................ | 411/374 |
| 5,475,750 A * | 12/1995 | McMonagle et al. | ..... | 379/355.01 |
| 5,602,536 A * | 2/1997 | Henderson et al. | ........... | 340/5.23 |
| 5,612,675 A * | 3/1997 | Jennings et al. | ............ | 340/573.1 |
| 5,654,701 A * | 8/1997 | Liao et al. | ......................... | 341/22 |
| 5,825,303 A * | 10/1998 | Bloss et al. | ............... | 340/870.02 |
| 5,877,703 A * | 3/1999 | Bloss et al. | ............... | 340/870.02 |
| 5,938,472 A * | 8/1999 | Yuen et al. | ..................... | 439/509 |
| 6,617,976 B2 * | 9/2003 | Walden et al. | ............ | 340/870.02 |
| RE38,348 E * | 12/2003 | Bloss et al. | ............... | 340/870.02 |
| 6,754,507 B2 * | 6/2004 | Takagi | ........................ | 455/550.1 |
| 7,058,176 B2 * | 6/2006 | Chen et al. | ................. | 379/433.13 |
| 7,136,681 B2 * | 11/2006 | Sadler et al. | ............... | 455/575.1 |
| 7,151,461 B2 * | 12/2006 | Wilson et al. | .................. | 340/644 |
| 7,238,901 B2 * | 7/2007 | Kim et al. | ..................... | 200/61.8 |
| 7,256,699 B2 * | 8/2007 | Tethrake et al. | ........... | 340/572.8 |
| 7,610,783 B2 * | 11/2009 | Rudduck et al. | ................. | 70/277 |
| 7,671,324 B2 * | 3/2010 | Fleischman et al. | ..... | 250/227.14 |
| 7,699,568 B2 * | 4/2010 | Sugiyama et al. | ........... | 411/82.5 |
| 7,708,510 B2 * | 5/2010 | Reimler | ........................ | 411/166 |
| 2005/0046733 A1 * | 3/2005 | Bang | .............................. | 348/335 |

* cited by examiner

*Primary Examiner* — R. A. Smith
*Assistant Examiner* — Tania C Courson

(57) ABSTRACT

A tamper-evident mechanism for use with an electronic appliance includes a first housing, a second housing, a fastening device and a shielding element. The first housing includes a perforation, which is surrounded by a ring-shape member. The second housing includes a groove corresponding to the perforation of the first housing, wherein the groove has an inner thread formed on a portion of inner wall thereof. The fastening device includes a head portion and a shaft portion, wherein the shaft portion has an external thread engaged with the inner thread of the groove and the head portion is sustained against the ring-shape member, thereby coupling the first housing with the second housing. The shielding element is inserted into the perforation of the first housing for shielding the head portion of the fastening device.

17 Claims, 7 Drawing Sheets

TAMPER-EVIDENT MECHANISM

FIELD OF THE INVENTION

The present invention relates to a tamper-evident mechanism, and more particularly to a tamper-evident mechanism for preventing the user from personally dismantling the fastening device.

BACKGROUND OF THE INVENTION

For assembling or combining two pieces of articles, a fastening device such as a screw is usually used. Generally, the fastening device can be dismantled by simply using a dismantling tool. For example, in a case that electronic appliance has got trouble or in views of curiosity about what is inside the electronic appliance, the user may personally detach the fastening device in order to examine the electronic components inside the electronic appliance. Since most users are often unfamiliar with the configuration and the circuitry of the electronic appliance, an incidental damage of the electronic appliance is possibly incurred. Moreover, the user may fail to reassemble the separated pieces of articles. If this electronic appliance is sent to the manufacturer offering the after-sales service, the serviceman may doubt whether the damage is naturally caused or man-made. Therefore, it is vital for the manufacturer to know if the product has not been altered since it left the manufacturer.

Take a power adapter for example. The power adapter usually comprises a first housing and a second housing coupled with each other. A closed space is defined between the first housing and the second housing for accommodating therein a printed circuit board. Conventionally, the first housing is coupled with the second housing via an ultrasonic welding technology or fastening a fastening device. Referring to FIG. 1, a schematic partial cross-sectional view of a conventional power adapter is illustrated. The first housing 11 is coupled with the second housing 12 via a fastening device 13. As shown in FIG. 1, the first housing 11 has a perforation 111. The second housing 12 has a groove 121 corresponding to the perforation 111 of the first housing 11. The groove 121 has an inner thread 122 formed on a portion of inner wall thereof. The fastening device 13 has a head portion 131 and a shaft portion 132. The shaft portion 132 has an external thread 133 wrapped around the free end thereof and mating with the inner thread 122 of the groove 121. For coupling the first housing 11 with the second housing 12, the shaft portion 132 of the fastening device 13 is penetrated through the perforation 111 of the first housing 11 and then screwed in the groove 121 such that the external thread 133 is engaged with the inner thread 122.

This mechanism of coupling the first housing 11 with the second housing 12 by the fastening device 13, however, has some drawbacks. For example, since the head portion 131 of the fastening device 13 is exposed outside the first housing 11, the user may personally detach the fastening device for examining the electronic components inside the power adapter by using a simple dismantling tool such as a screwdriver. In a case that the power adapter is sent to the manufacturer offering the after-sales service, the user and the serviceman may dispute whether the damage is naturally caused or man-made.

Therefore, there is a need to provide a tamper-evident mechanism for preventing the user from personally dismantling the fastening device.

SUMMARY OF THE INVENTION

It is an object of the present invention to provide a tamper-evident mechanism for preventing the user from personally dismantling the fastening device, so that the manufacturer can know if the product has not been altered since it left the manufacturer and the disputes about the cause of damaged electronic appliance are reduced.

It is another object of the present invention to provide a tamper-evident mechanism for preventing the user from personally dismantling the fastening device, thereby reducing the possibility of damaging the electronic appliance by the user.

In accordance with an aspect of the present invention, there is provided a tamper-evident mechanism for use with an electronic appliance. The tamper-evident mechanism comprises a first housing, a second housing, a fastening device and a shielding element. The first housing includes a perforation, which is surrounded by a ring-shape member. The second housing includes a groove corresponding to the perforation of the first housing, the groove having an inner thread formed on a portion of inner wall thereof. The fastening device includes a head portion and a shaft portion, wherein the shaft portion has an external thread engaged with the inner thread of the groove and the head portion is sustained against the ring-shape member, thereby coupling the first housing with the second housing. The shielding element is inserted into the perforation of the first housing for shielding the head portion of the fastening device.

In accordance with another aspect of the present invention, there is provided an electronic appliance having a tamper-evident mechanism. The electronic appliance comprises a first housing, a second housing, a fastening device, a shielding element and a circuit board. The first housing includes a perforation, which is surrounded by a ring-shape member. The second housing includes a groove corresponding to the perforation of the first housing, the groove having an inner thread formed on a portion of inner wall thereof. The fastening device includes a head portion and a shaft portion, wherein the shaft portion has an external thread engaged with the inner thread of the groove and the head portion is sustained against the ring-shape member, thereby coupling the first housing with the second housing. The shielding element is inserted into the perforation of the first housing for shielding the head portion of the fastening device. The circuit board is accommodated within a closed space defined between the first housing and the second housing.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
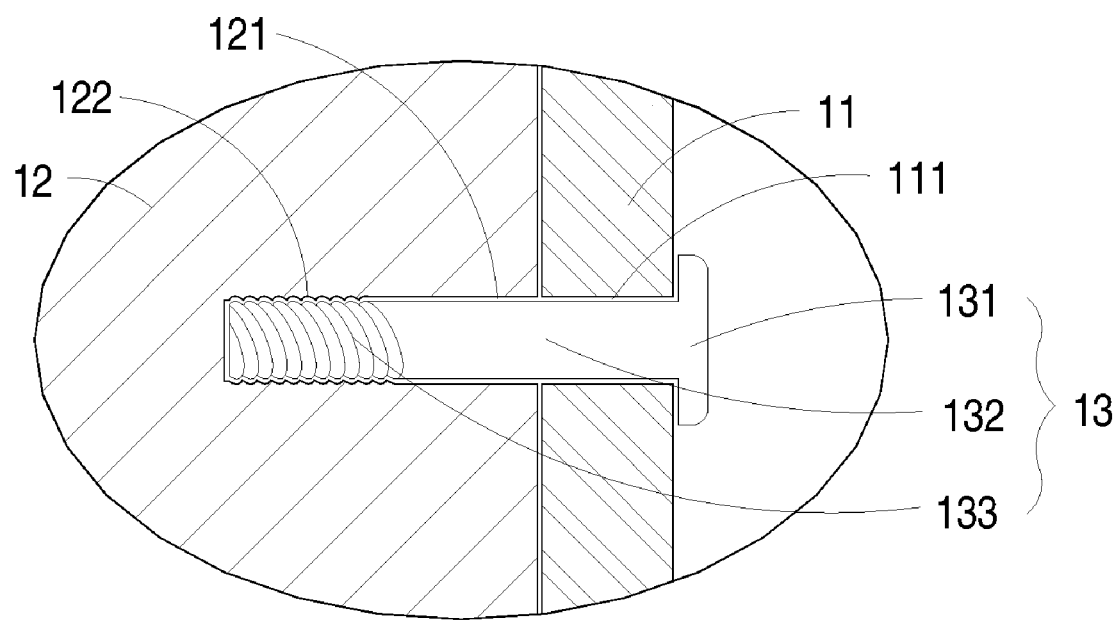
FIG. 1 is a schematic partial cross-sectional view illustrating a first housing and a second housing of a conventional power adapter.
Figure 2:
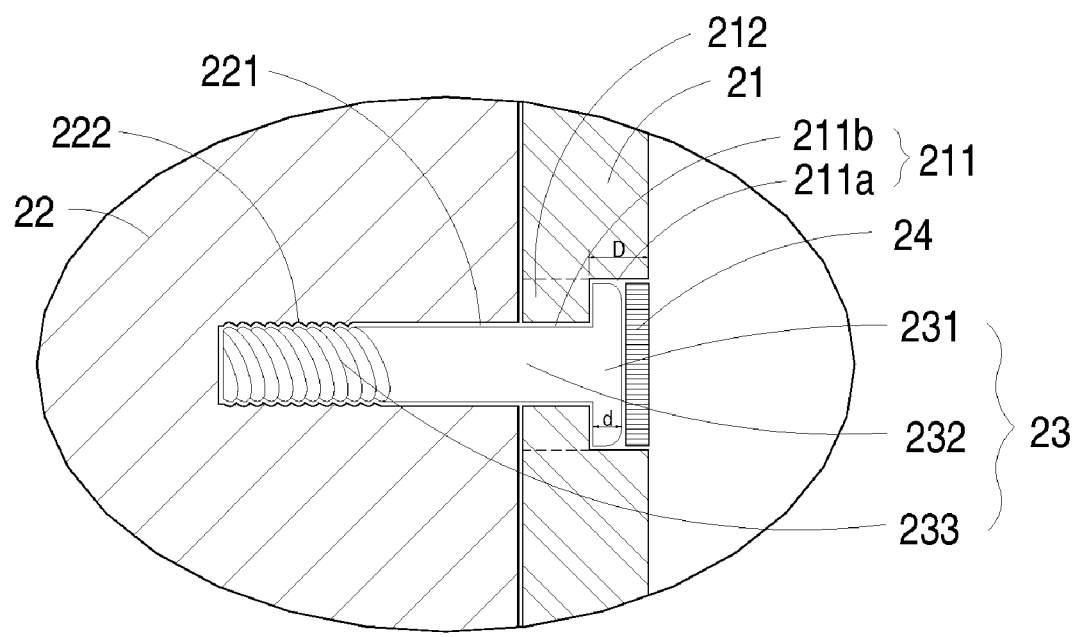
FIG. 2 is a schematic cross-sectional view illustrating a tamper-evident mechanism according to a preferred embodiment of the present invention.

Referring to FIG. 2, a schematic cross-sectional view of a tamper-evident mechanism according to a preferred embodiment of the present invention is illustrated. The tamper-evident mechanism of this embodiment can be applied to electronic devices such as power adapters, game consoles or power supply apparatuses. The electronic device as shown in FIG. 2 includes a first housing 21, a second housing 22, a fastening device 23 and a shielding element 24. The first housing 21 has a perforation 211. The second housing 22 has a groove 221 corresponding to the perforation 211 of the first housing 21. The groove 221 has an inner thread 222 formed on a portion of inner wall thereof. The perforation 211 of the first housing 21 includes a first perforation region 211a and a second perforation region 211b. The second perforation region 211b is surrounded by a ring-shape member 212 such that the diameter of the second perforation region 211b is smaller than that of the first perforation region 211a.

Figure 3:
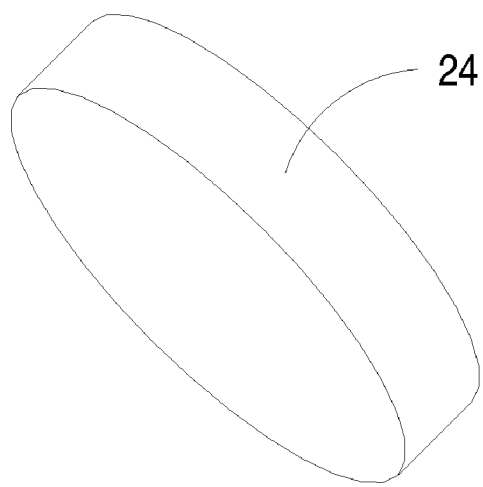
FIG. 3 is a schematic perspective view illustrating the shielding element used in FIG. 2.

In this embodiment, the fastening device 23 includes but is not limited to a screw. The fastening device 23 has a head portion 231 and a shaft portion 232. The head portion 231 has for example a cross recess, a linear recess or a polygonal recess (not shown), which can be driven by a simple dismantling tool such as a screwdriver. The shaft portion 232 has an external thread 233 wrapped around the free end thereof and mating with the inner thread 222 of the groove 221. For coupling the first housing 21 with the second housing 22, the shaft portion 232 of the fastening device 23 is penetrated through the perforation 211 of the first housing 21 and then screwed in the groove 221 such that the external thread 233 is engaged with the inner thread 222. Meanwhile, the head portion 231 of the fastening device 23 is sustained against the ring-shape member 212. Since the thickness d of the head portion 231 of the fastening device 23 is smaller than the depth D of the first perforation region 211a of the perforation 211, a gap exists in the first perforation region 211a and between the head portion 231 of the fastening device 23 and the surface of the first housing 21. In accordance with a specific feature of the present invention, the shielding element 24 (as is also shown in FIG. 3) is then inserted into the gap to shield the head portion 231 of the fastening device 23 after the first housing 21 is coupled with the second housing 22 via the fastening device 23. An exemplary shielding element 24 includes a disc-shaped pad, which is made of rubbery or plastic material. After the shielding element 24 is inserted into the gap in the first perforation region 211a, the fastening device 23 is shielded and tightly sealed by the shielding element 24. Since the fastening device 23 is not visible and the shielding element 24 is removed with difficulty, the motive for the user to personally detach the fastening device 23 is considerably diminished. Optionally, the exposed surface of the shielding element 24 is at the same level with the surface of the first housing 21, so that the actual position of the fastening device 23 is hard to be recognized.

Figure 4:
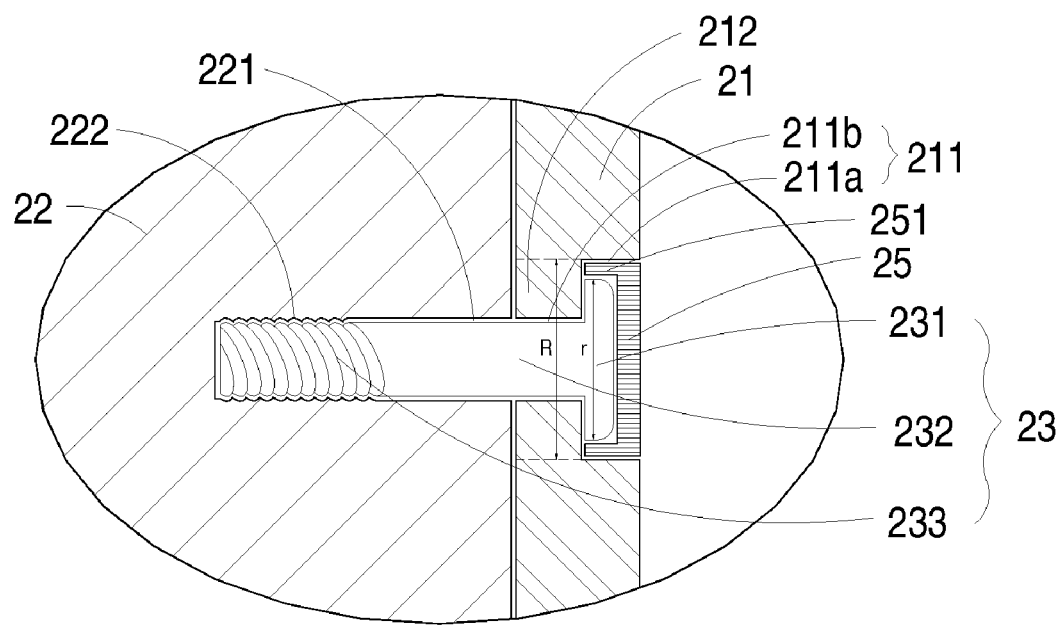
FIG. 4 is a schematic cross-sectional view illustrating a tamper-evident mechanism according to another preferred embodiment of the present invention.
Figure 5:
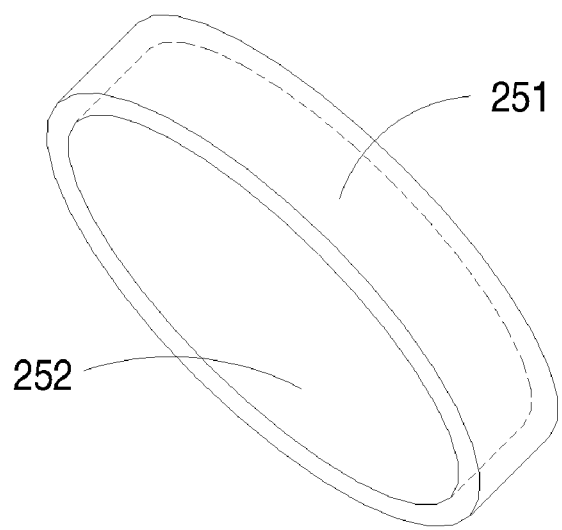
FIG. 5 is a schematic perspective view illustrating the shielding element used in FIG. 4.

A further embodiment of a tamper-evident mechanism is illustrated in FIG. 4. In this embodiment, the first housing 21, the second housing 22 and shaft portion 232 of the fastening device 23 included therein are similar to those shown in FIG. 2, and are redundantly described herein. In addition, the diameter r of the head portion 231 of the fastening device 23 is smaller than the diameter R of the first perforation region 211a of the perforation 211, and the shielding element 25 used in this embodiment is a cup-shaped rubbery or plastic pad. Referring to FIGS. 4 and 5, the shielding element 25 includes a body portion 251 and a hollow portion 252. The head portion 231 of the fastening device 23 is accommodated within the hollow portion 252 of the shielding element 25. The vacant space of the first perforation region 211a is occupied by the body portion 251 of the shielding element 25. Similarly, since the fastening device 23 is not visible and the shielding element 25 is removed with difficulty, the motive for the user to personally detach the fastening device 23 is considerably diminished.

Figure 6:
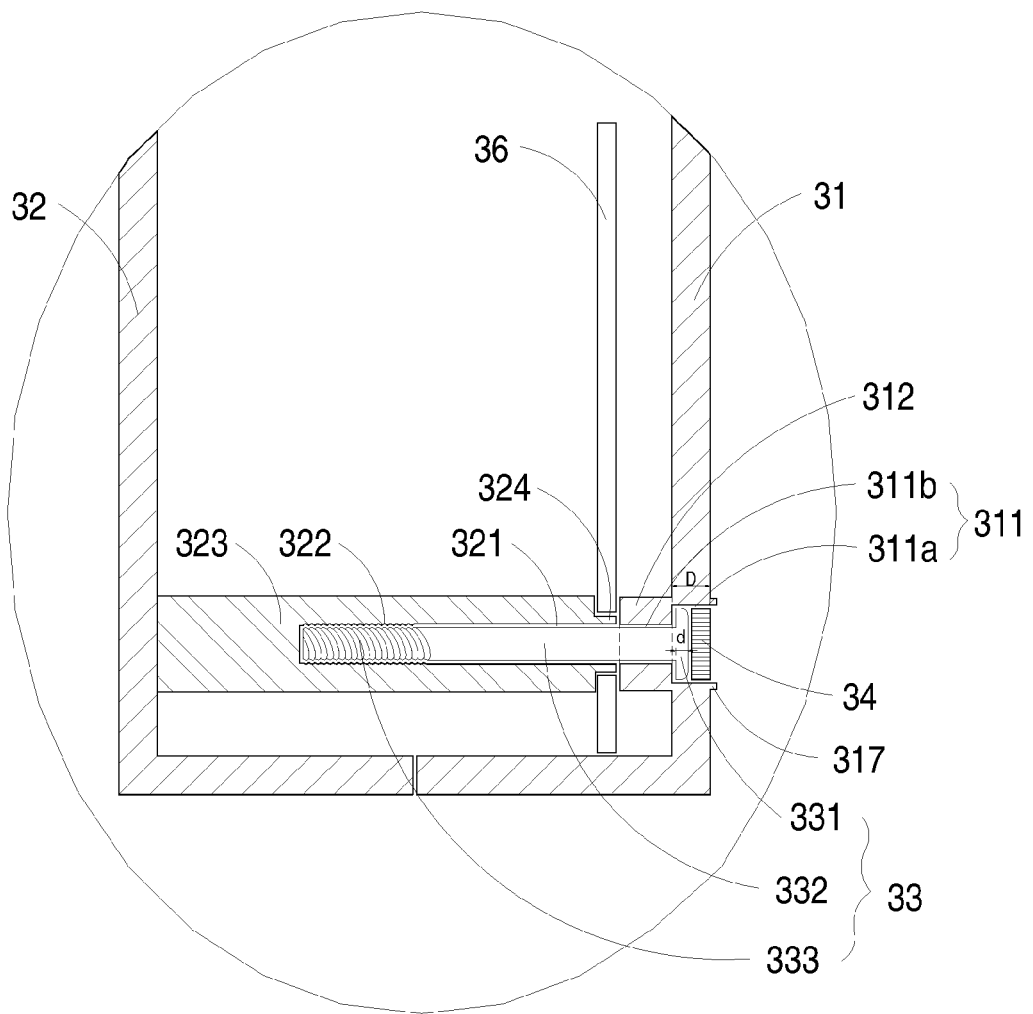
FIG. 6 is a schematic cross-sectional view illustrating a tamper-evident mechanism according to another preferred embodiment of the present invention.

Referring to FIG. 6, a schematic cross-sectional view of a tamper-evident mechanism according to a further preferred embodiment of the present invention is illustrated. The tamper-evident mechanism of this embodiment can be applied to electronic devices such as power adapters, game consoles or power supply apparatuses. The electronic device as shown in FIG. 6 includes a first housing 31, a second housing 32, a fastening device 33 and a shielding element 34. The first housing 31 has a perforation 311. The perforation 311 of the first housing 31 includes a first perforation region 311a and a second perforation region 311b. The second perforation region 311b is surrounded by a ring-shape member 312 such that the diameter of the second perforation region 311b is smaller than that of the first perforation region 311a. In this embodiment, the ring-shape member 312 is protruded from the inner surface of the first housing 31. A cylindrical protrusion post 323 is protruded from the inner surface of the second housing 32. The end of the protrusion post 323 is formed as a throat portion 324. The protrusion post 323 has an inner thread 322 formed on a portion of inner wall thereof and corresponding to the perforation 311 of the first housing 31.

In this embodiment, the fastening device 33 includes but is not limited to a screw. The fastening device 33 has a head portion 331 and a shaft portion 332. The head portion 331 has for example a cross recess, a linear recess or a polygonal recess (not shown), which can be driven by a simple dismantling tool such as a screwdriver. The shaft portion 332 has an external thread 333 wrapped around the free end thereof and mating with the inner thread 322 of the groove 321. For coupling the first housing 31 with the second housing 32, a fixing hole (not shown) of a circuit board 36 is firstly sheathed around the throat portion 324 of the protrusion post 323 such that the circuit board 36 is supported on the throat portion 324. Subsequently, the shaft portion 332 of the fastening device 33 is penetrated through the perforation 311 of the first housing 31 and crewed in the groove 321 such that the external thread 333 is engaged with the inner thread 322 of the groove 321. Meanwhile, the head portion 331 of the fastening device 33 is sustained against the ring-shape member 312. Since the thickness d of the head portion 331 of the fastening device 33 is smaller than the depth D of the first perforation region 311a of the perforation 311, a gap exists in the first perforation region 311a and between the head portion 331 of the fastening device 33 and the surface of the first housing 31. After the first housing 31 is coupled with the second housing 32 via the fastening device 33, the shielding element 34 is inserted into the gap to shield the head portion 331 of the fastening device 33. An exemplary shielding element 34 includes a disc-shaped pad, which is made of rubbery or plastic material. After the shielding element 34 is inserted into the gap in the first perforation region 311a, the fastening device 33 is shielded and tightly sealed by the shielding element 34. Since the fastening device 33 is not visible and the shielding element 34 is removed with difficulty, the motive for the user to personally detach the fastening device 33 is considerably diminished. Optionally, the exposed surface of the shielding element 34 is at the same level with the surface of the first housing 31, so that the actual position of the fastening device 33 is hard to be recognized. Alternatively, a ring-shaped raised structure 317 is formed on the surface of the first housing at the periphery of the perforation 311. In a case that the electronic appliance stands upright, the ring-shaped raised structure 317 is used for supporting the electronic appliance.

Figure 7:
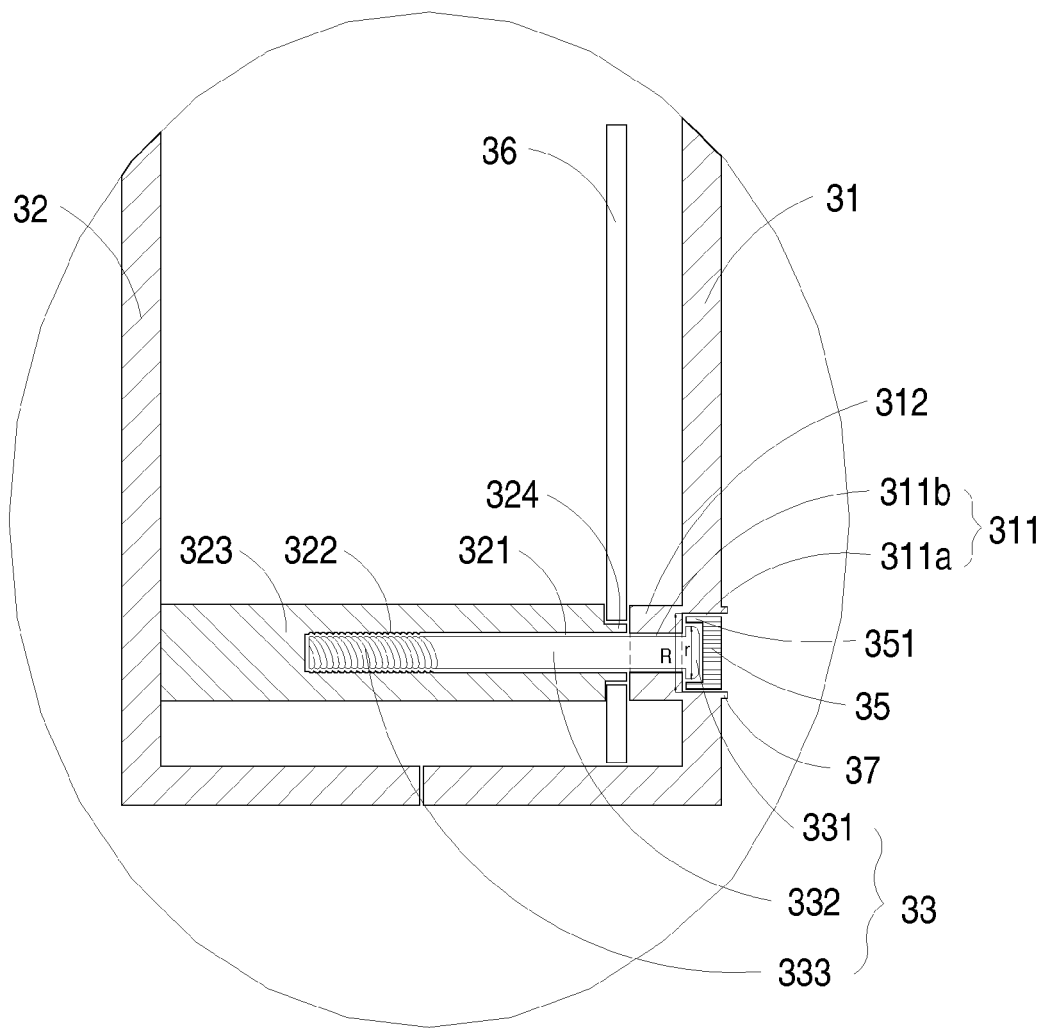
FIG. 7 is a schematic cross-sectional view illustrating a tamper-evident mechanism according to another preferred embodiment of the present invention.

A further embodiment of a tamper-evident mechanism is illustrated in FIG. 7. In this embodiment, the first housing 31, the second housing 32 and shaft portion 332 of the fastening device 33 included therein are similar to those shown in FIG. 6, and are redundantly described herein. In addition, the diameter r of the head portion 331 of the fastening device 33 is smaller than the diameter R of the first perforation region 311a of the perforation 311, and the shielding element 35 used in this embodiment is a cup-shaped rubbery or plastic pad. Like the shielding element 25 as shown in FIG. 5, the shielding element 35 includes a body portion 351 and a hollow portion 352. The head portion 331 of the fastening device 33 is accommodated within the hollow portion 352 of the shielding element 35. The vacant space of the first perforation region 311a is occupied by the body portion 351 of the shielding element 35. Similarly, since the fastening device 33 is not visible and the shielding element 35 is removed with difficulty, the motive for the user to personally detach the fastening device 33 is considerably diminished.

Figure 8:
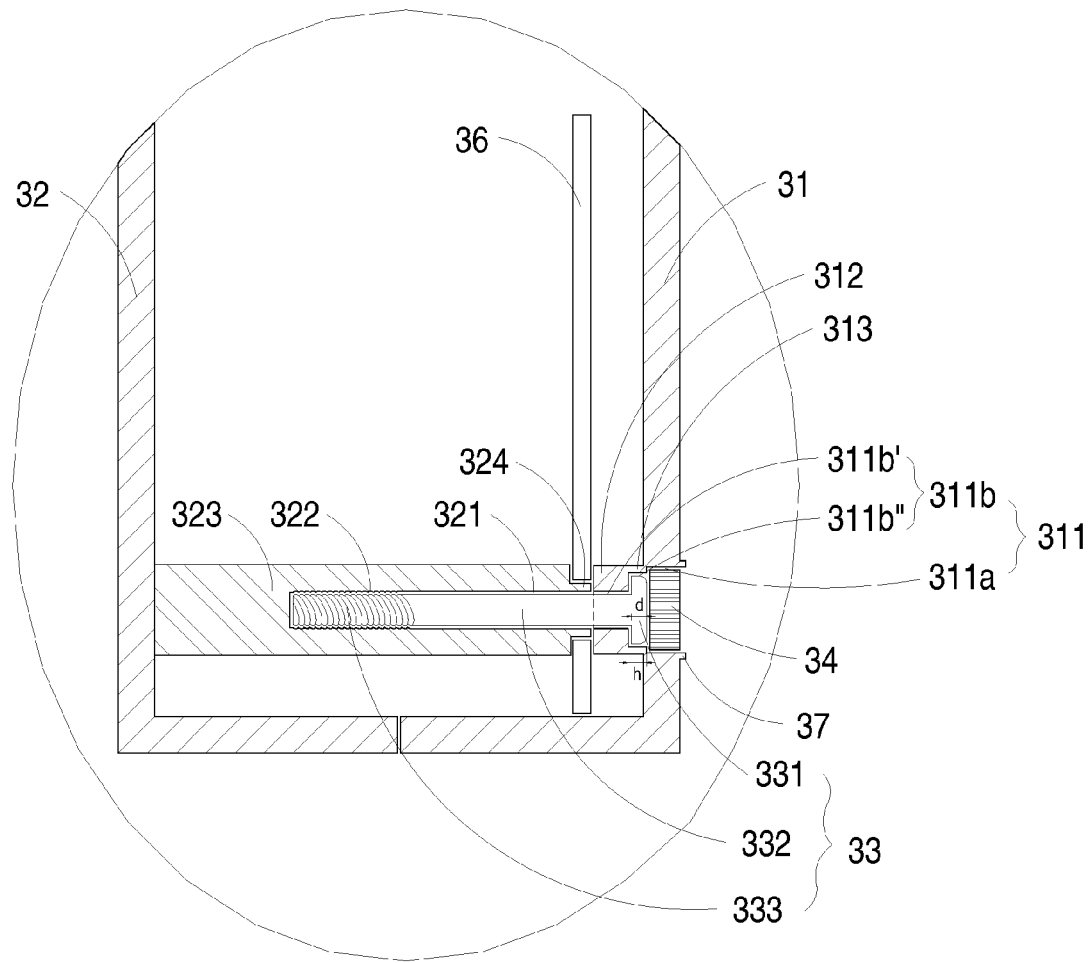
FIG. 8 is a schematic cross-sectional view illustrating a tamper-evident mechanism according to another preferred embodiment of the present invention.

A further embodiment of a tamper-evident mechanism is illustrated in FIG. 8. In this embodiment, the second housing 32, shaft portion 332 of the fastening device 33 and the circuit board 36 included therein are similar to those shown in FIG. 6, and are redundantly described herein. In addition, the perforation 311 of the first housing 31 includes a first perforation region 311a and a second perforation region 311b, wherein the second perforation region 311b includes a first sub-region 311b' and a second sub-region 311b". The first sub-region 311b' is surrounded by a first ring-shape member 312. The second sub-region 311b" is arranged between the first sub-region 311b' and the first perforation region 311a, and surrounded by a second ring-shape member 313. The diameter of the first sub-region 311b' is smaller than that of the second sub-region 311b". In this embodiment, the shielding element 34 includes a disc-shaped pad, which is made of rubbery or plastic material. For coupling the first housing 31 with the second housing 32, a fixing hole (not shown) of a circuit board 36 is firstly sheathed around the throat portion 324 of the protrusion post 323 such that the circuit board 36 is supported on the throat portion 324. Subsequently, the shaft portion 332 of the fastening device 33 is penetrated through the perforation 311 of the first housing 31 and crewed in the groove 321 such that the external thread 333 is engaged with the inner thread 322 of the groove 321. Meanwhile, the head portion 331 of the fastening device 33 is sustained against the first ring-shape member 312. Since the thickness d of the head portion 331 of the fastening device 33 is substantially equal to the depth h of the second sub-region 311b" of the second perforation region 311b, a gap exists in the first perforation region 311a and between the head portion 331 of the fastening device 33 and the surface of the first housing 31. After the first housing 31 is coupled with the second housing 32 via the fastening device 33, the shielding element 34 is inserted into the gap to shield the head portion 331 of the fastening device 33. Likewise, after the shielding element 34 is inserted into the gap in the first perforation region 311a, the fastening device 33 is shielded and tightly sealed by the shielding element 34. Since the fastening device 33 is not visible and the shielding element 34 is removed with difficulty, the motive for the user to personally detach the fastening device 33 is considerably diminished. Optionally, the exposed surface of the shielding element 34 is at the same level with the surface of the first housing 31, so that the actual position of the fastening device 33 is hard to be recognized. Alternatively, a ring-shaped raised structure 317 is formed on the surface of the first housing at the periphery of the perforation 311. In a case that the electronic appliance stands upright, the ring-shaped raised structure 317 is used for supporting the electronic appliance.

Figure 9:
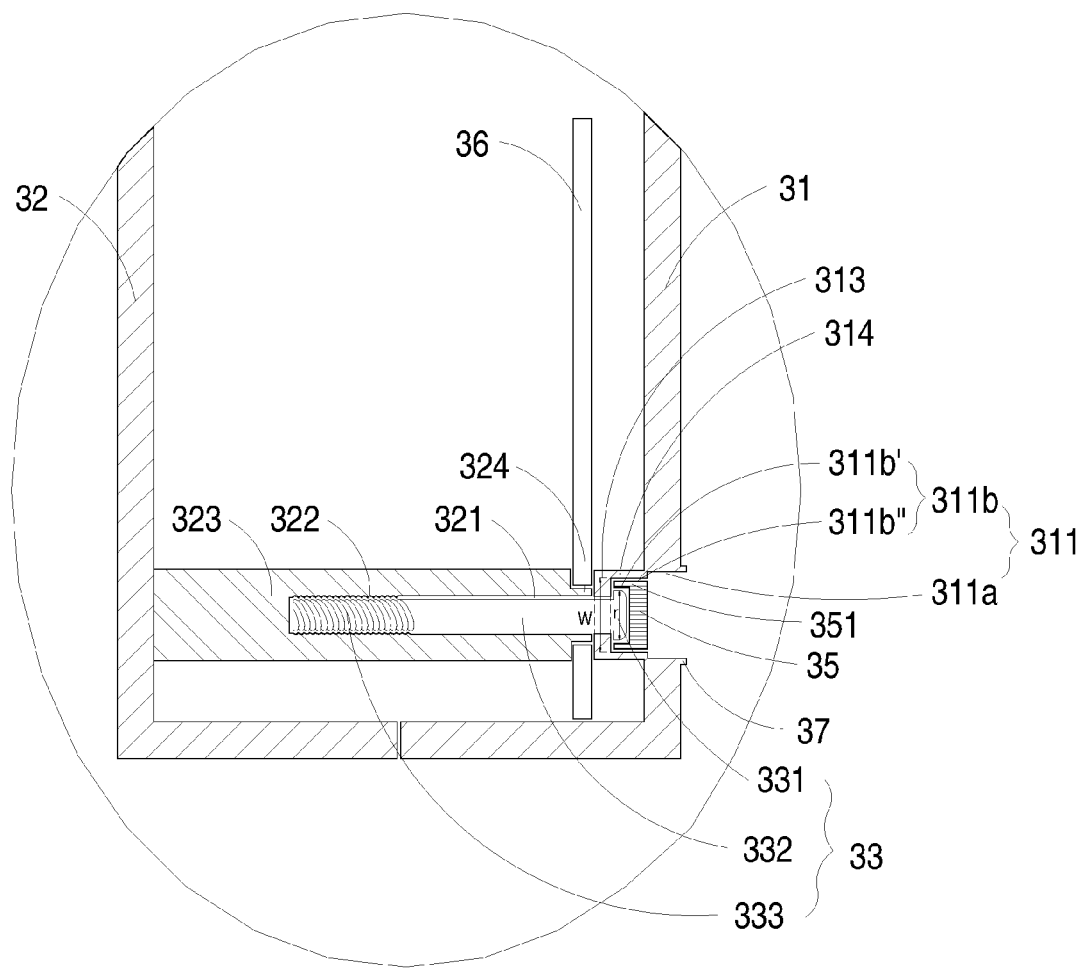
FIG. 9 is a schematic cross-sectional view illustrating a tamper-evident mechanism according to another preferred embodiment of the present invention.

A further embodiment of a tamper-evident mechanism is illustrated in FIG. 9. In this embodiment, the first housing 31, the second housing 32 and shaft portion 332 of the fastening device 33 included therein are similar to those shown in FIG. 8, and are redundantly described herein. In addition, the diameter r of the head portion 331 of the fastening device 33 is smaller than the diameter w of the second sub-region 311b" of the second perforation region 311b, and the shielding element 35 used in this embodiment is a cup-shaped rubbery or plastic pad. Like the shielding element 25 as shown in FIG. 5, the shielding element 35 includes a body portion 351 and a hollow portion 352. The head portion 331 of the fastening device 33 is accommodated within the hollow portion 352 of the shielding element 35. The vacant space of the second sub-region 311b" of the second perforation region 311b is occupied by the body portion 351 of the shielding element 35. Similarly, since the fastening device 33 is not visible and the shielding element 35 is removed with difficulty, the motive for the user to personally detach the fastening device 33 is considerably diminished.

From the above embodiment, the tamper-evident mechanism of the present invention is capable of for preventing the user from personally dismantling the fastening device. As a consequence, the manufacturer can know if the product has not been altered since it left the manufacturer and the disputes about the cause of damaged electronic appliance are reduced. Moreover, the possibility of damaging the electronic appliance by the user is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tamper-evident mechanism for use with an electronic appliance, said tamper-evident mechanism comprising:
 a first housing including a perforation, wherein a ring-shape member is disposed in said perforation;

a second housing including a groove corresponding to said perforation of said first housing, said groove having an inner thread formed on a portion of inner wall thereof;

a fastening device including a head portion and a shaft portion, wherein said shaft portion has an external thread engaged with said inner thread of said groove and said head portion is received in said perforation and sustained against said ring-shape member in said perforation, thereby coupling said first housing with said second housing; and a shielding element inserted into said perforation of said first housing for shielding said head portion of said fastening device, wherein said shielding element is a cup-shaped pad.

2. The tamper-evident mechanism according to claim 1 wherein said perforation of said first housing includes a first perforation region and a second perforation region, said first perforation region of said perforation is surrounded by said ring-shape member, and the diameter of said second perforation region is smaller than that of said first perforation region.

3. The tamper-evident mechanism according to claim 2 wherein the thickness of said head portion of said fastening device is smaller than the depth of said first perforation region of said perforation.

4. The tamper-evident mechanism according to claim 3 wherein the diameter of said head portion of said fastening device is smaller than that of said first perforation region of said perforation.

5. The tamper-evident mechanism according to claim 4 wherein said shielding element is made of rubbery or plastic material, and said shielding element is inserted into said first perforation region of said perforation for shielding said head portion of said fastening device.

6. The tamper-evident mechanism according to claim 5 wherein said shielding element includes a body portion and a hollow portion, said head portion of said fastening device is accommodated within said hollow portion of said shielding element, and the vacant space of said first perforation region is occupied by said body portion of said shielding element.

7. The tamper-evident mechanism according to claim 2 wherein said ring-shape member is protruded from the inner surface of said first housing.

8. The tamper-evident mechanism according to claim 7 wherein a cylindrical protrusion post is protruded from the inner surface of said second housing, and said groove is formed in said protrusion post and corresponding to said second perforation region of said perforation of said first housing.

9. The tamper-evident mechanism according to claim 8 wherein an end of said protrusion post is formed as a throat portion, and a fixing hole of a circuit board is firstly sheathed around said throat portion.

10. The tamper-evident mechanism according to claim 9 wherein the thickness of said head portion of said fastening device is smaller than the depth of said first perforation region of said perforation.

11. The tamper-evident mechanism according to claim 10 wherein the thickness of said head portion of said fastening device is smaller than the depth of said first perforation region of said perforation, and the diameter of said head portion of said fastening device is smaller than that of said first perforation region of said perforation.

12. The tamper-evident mechanism according to claim 11 wherein said shielding element is made of rubbery or plastic material, and said shielding element is inserted into said first perforation region of said perforation for shielding said head portion of said fastening device.

13. The tamper-evident mechanism according to claim 12 wherein said shielding element includes a body portion and a hollow portion, said head portion of said fastening device is accommodated within said hollow portion of said shielding element, and the vacant space of said first perforation region is occupied by said body portion of said shielding element.

14. The tamper-evident mechanism according to claim 7 wherein said second perforation region includes a first sub-region and a second sub-region, said first sub-region is surrounded by said ring-shape member, said second sub-region is surrounded by another ring-shape member, and the diameter of said first sub-region is smaller than that of said second sub-region.

15. The tamper-evident mechanism according to claim 14 wherein the diameter of said head portion of said fastening device is smaller than the diameter of said second sub-region of said second perforation region, said shielding element is made of rubbery or plastic material, and said shielding element is inserted into said second sub-region of said second perforation region for shielding said head portion of said fastening device.

16. The tamper-evident mechanism according to claim 1 wherein said fastening device is a screw, and said electronic appliance is selected from a group consisting of a power adapters, a game console or a power supply apparatus.

17. An electronic appliance having a tamper-evident mechanism, said electronic appliance comprising:

a first housing including a perforation, wherein a ring-shape member is disposed in said perforation;

a second housing including a groove corresponding to said perforation of said first housing, said groove having an inner thread formed on a portion of inner wall thereof;

a fastening device including a head portion and a shaft portion, wherein said shaft portion has an external thread engaged with said inner thread of said groove and said head portion is received in said perforation and sustained against said ring-shape member in said perforation, thereby coupling said first housing with said second housing;

a shielding element inserted into said perforation of said first housing for shielding said head portion of said fastening device, wherein said shielding element is a cup-shaped pad; and a circuit board accommodated within a closed space defined between said first housing and said second housing.

* * * * *